(12) United States Patent
Miyairi et al.

(10) Patent No.: US 7,868,497 B2
(45) Date of Patent: Jan. 11, 2011

(54) AIRTIGHT-TYPE ELECTRIC MOTOR

(75) Inventors: Shigenori Miyairi, Nagano (JP); Ikuo Takeshita, Nagano (JP); Koji Nakatake, Nagano (JP); Hisayuki Miyajima, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 11 days.

(21) Appl. No.: 12/391,687

(22) Filed: Feb. 24, 2009

(65) Prior Publication Data
US 2009/0212655 A1    Aug. 27, 2009

(30) Foreign Application Priority Data
Feb. 25, 2008    (JP) .............................. 2008-043548

(51) Int. Cl.
*H02K 5/10*    (2006.01)
*H02K 5/24*    (2006.01)
(52) U.S. Cl. .............................. 310/88; 310/51; 310/89
(58) Field of Classification Search .................... 310/85, 310/88–89, 400, 402, 405, 410, 412, 413, 310/52, 54, 56, 51
See application file for complete search history.

(56) References Cited

U.S. PATENT DOCUMENTS

| 5,248,938 | A  | * | 9/1993 | Kobayashi et al. | ..... 324/207.16 |
| 6,849,973 | B2 | * | 2/2005 | Kurosawa et al. | ........ 310/49.01 |
| 6,867,518 | B2 | * | 3/2005 | Kurosawa | .................... 310/89 |

FOREIGN PATENT DOCUMENTS

JP    2001-280501    10/2001

* cited by examiner

*Primary Examiner*—Quyen Leung
*Assistant Examiner*—Eric Johnson
(74) *Attorney, Agent, or Firm*—Rankin, Hill & Clark LLP

(57) ABSTRACT

An airtight-type electric motor capable of reducing vibration is provided. Inside ribs of a pair of end brackets and are respectively fitted into core end portions of a stator core. Outside ribs of the pair of end brackets and are respectively brought into contact against end surfaces of the core end portions of a yoke of the stator core. With this arrangement, the pair of end brackets and are fixed to the stator core, and a housing and the stator core are arranged, without being coupled together.

6 Claims, 2 Drawing Sheets

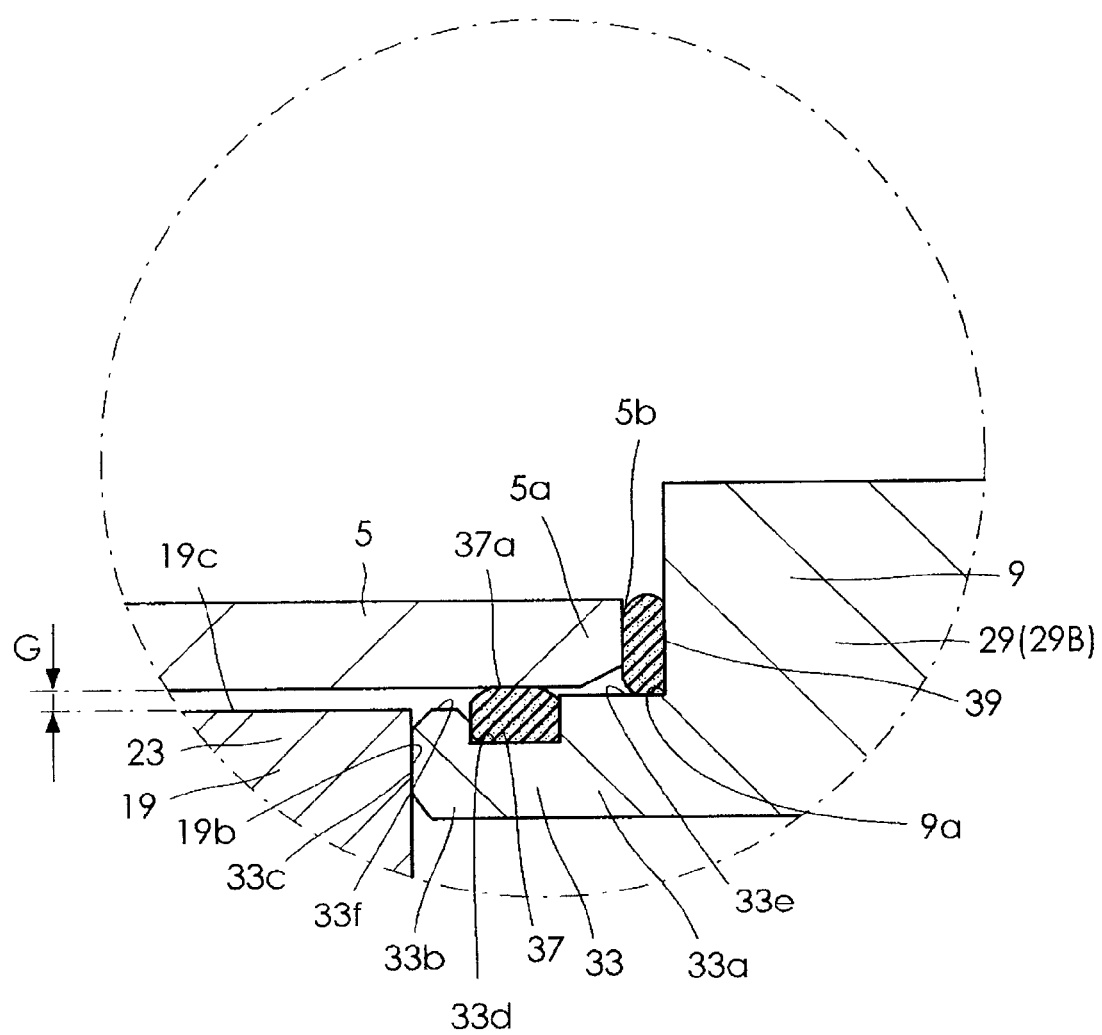

AIRTIGHT-TYPE ELECTRIC MOTOR

BACKGROUND OF THE INVENTION

The present invention relates to an airtight-type electric motor used in a very low temperature freezer, for example.

A conventional airtight-type electric motor is disclosed in Japanese Patent Application Publication No. 2001-280501 (JP2001-280501A) or the like. The conventional electric motor comprises a rotor having a shaft, a stator including a stator core arranged radially outside of the shaft and a plurality of winding portions, and a cylindrical housing. The cylindrical housing surrounds the stator and is arranged radially outside of the stator. The shaft is rotatably supported by a pair of end brackets through a pair of bearings. In the airtight-type electric motor in particular, the housing serves to ensure pressure resistance and airtightness. The housing is connected to the pair of end brackets by fitting means or the like. An outer circumferential surface of the stator core is fixed to an inner circumferential surface of the housing by adhesive.

In the airtight-type electric motor of this type, reduction of vibration of the electric motor caused by rotation is demanded. However, in such an airtight-type electric motor, there is a limit to reducing the vibration of the electric motor.

Further, in the conventional airtight-type electric motor, when the stator core is fixed to the housing, the stator core must be pushed in or bonded inside the housing. For this reason, after the stator core has been fixed to the housing, the winding portions are formed. For formation of the winding portions, insulators with electric wires wound therearound are fitted with the stator core, or after an insulator has been fitted with the stator core, the electric wires are wound around the stator core through the insulator. In both cases, however, connection of electric wire ending portions after the electric wires have been wound must be manually performed due to presence of the housing.

SUMMARY OF THE INVENTION

An object of the present invention is to provide an airtight-type electric motor capable of reducing vibration of the electric motor.

Another object of the present invention is to provide an airtight-type electric motor for which connection of electric wire ending portions may be performed by machine automation.

An airtight-type electric motor of the present invention comprises: a rotor including a rotor member and a shaft with the rotor member fixed thereto; a stator; a pair of bearings; a pair of end brackets; a cylindrical housing; and a pair of airtight coupling structures. The stator includes a stator core located radially outside of the shaft and a plurality of winding portions mounted on the stator core. The stator core includes core end portions which oppose to each other in an axial direction of the shaft. The pair of bearings rotatably support the shaft. The pair of bearings are respectively fixed to the pair of end brackets. The pair of end brackets are fixed to the core end portions of the stator core through fitting structures. The cylindrical housing is located radially outside of the stator and surrounds the stator. The housing includes housing end portions which oppose to each other in the axial direction. A pair of airtight coupling structures airtightly couple the end brackets to the housing end portions. The housing and the stator core are not coupled.

As a result of study, the inventors of this application have found that, since a stator core is fixed to a housing in a conventional airtight-type electric motor, the stator core is affected by the processing accuracy of the housing, and there is therefore a limit to enhancing concentricity between a rotor and a stator. The inventor has found that because of the limit to enhancing the concentricity between the rotor and the stator, vibration of an electric motor caused by rotation cannot be sufficiently reduced. According to the present invention, the pair of end brackets are fixed to the core end portions on both sides in the axial direction of the stator core through the fitting structures. By adopting such a structure, the pair of end brackets may be firmly fixed to the stator core, and the housing and the stator core may be arranged, without being coupled together. For this reason, concentricity among the center of the stator core and the centers of the pair of end brackets may be enhanced. As a result, concentricity between the rotor and the stator may be enhanced, and vibration of the electric motor may be thereby reduced.

Assume that the housing and the stator core may be arranged without being coupled together, as in the present invention. Then, the conventional step of pushing in or bonding the stator core inside the housing is eliminated. The winding portions may be thereby formed on the stator core that is not coupled to the housing. For this reason, connection of electric wire ending portions may be performed without being disturbed by presence of the housing. The connection may be therefore performed by machine automation.

Further, according to the present invention, an outer circumferential surface of the stator core is not fixed to an inner circumferential surface of the housing by adhesive. Generation of out gas from the adhesive between the housing and the stator core as in a related art may be therefore prevented.

The end bracket may comprise: a bracket body; an inside rib; and an annular outside rib. The inside rib is integrally formed with the bracket body and is inserted into inside the stator core to be fitted into the core end portion of the stator core. The annular outside rib is integrally formed with the bracket body and is located radially outside of the inside rib to be inserted into inside the housing end portion. The outside rib is in contact against an end surface of the core end portion of the stator core and is airtightly coupled to the housing end portion of the housing through the airtight coupling structure. Then, the bearing is fitted into inside of the inside rib. With this arrangement, the inside and outside ribs may firmly fix the pair of end brackets to the core end portions on both sides in the axial direction of the stator core, using a simple structure.

The airtight coupling structure may comprise: a first O-ring arranged between the outside rib and an inner circumferential surface of the housing end portion; and a second O-ring arranged between an end surface of the housing end portion and the bracket body of the end bracket. With this arrangement, the pair of end brackets and the housing end portions on both sides in the axial direction of the housing may be efficiently and airtightly coupled, using the small number of the O-rings.

An annular groove that opens radially toward an outside of the outside rib may be formed in the outside rib, and the first O-ring may be fitted into the annular groove. With this arrangement, just by arranging the first O-ring in the annular groove, airtightness between the outside rib and the housing may be maintained.

Preferably, an annular O-ring positioning corner portion on which the second O-ring is arranged is formed between an inner surface of the bracket body of the end bracket and an outer circumferential surface of the outside rib. With this arrangement, just by arranging the second O-ring in the annular O-ring positioning corner portion of the end bracket, airtightness between the bracket body and the housing may be maintained.

A plurality of assembling through-holes may be formed in the bracket body of one of the pair of end brackets to insert a plurality of fastening screw members therein. A plurality of screw holes may be formed in the bracket body of the other of the pair of end brackets to screw threaded portions formed at tip portions of the fastening screw members therein. In this case, preferably, the respective members are mounted as follows. First, the shaft of the rotor is supported by the pair of bearings fixed to the pair of end brackets. The stator and the housing are arranged between the pair of end brackets. Then, the pair of airtight coupling structures are arranged between the end brackets and the housing end portions. In this combination state, the fastening screw members are inserted into the assembling through-holes formed in the bracket body of the one of the pair of end brackets. Then, the threaded portions of the fastening screw portions are screwed into the screw holes formed in the bracket body of the other of the pair of end brackets, thereby pressing the outside ribs of the end brackets against the end surfaces of core end portions of the stator core and pressing the end brackets against the housing through the second O-rings. With this arrangement, just by screwing the threaded portions of the fastening screw portions into the screw holes formed in the bracket body of the other of the pair of end brackets, the outside ribs of the end brackets are pressed against the end surfaces of the core end portions of the stator core, and the second O-ring is compressed by between the end bracket and the housing. For this reason, by adjusting fastening degrees of the fastening screw members, airtightness between the end bracket and the housing may be appropriately maintained.

According to the present invention, the pair of end brackets are fixed to the core end portions on both sides in the axial direction of the stator core through the fitting structures. Accordingly, the pair of end brackets may be firmly fixed to the stator core, and the housing and the stator core may be arranged without being coupled. For this reason, concentricity among the center of the stator core and the centers of the pair of end brackets may be enhanced, without the stator core being affected by the housing. As a result, concentricity between the rotor and the stator may be enhanced, and vibration of the electric motor may be thereby reduced.

The housing and the stator core are arranged without being coupled together. Thus, the conventional step of pushing in or bonding the stator core inside the housing is eliminated. The winding portions may be thereby formed on the stator core that is not coupled to the housing. For this reason, connection of electric wire ending portions may be performed without being disturbed by presence of the housing. The connection may be therefore performed by machine automation.

Further, the outer circumferential surface of the stator core is not fixed to the inner circumferential surface by adhesive. Generation of out gas from the adhesive between the housing and the stator core as in the related art may be prevented.

BRIEF DESCRIPTION OF THE DRAWINGS

These and other objects and many of the attendant advantages of the present invention will be readily appreciated as the same becomes better understood by reference to the following detailed description when considered in connection with the accompanying drawings.

FIG. 2 is a magnified view of a portion indicated by reference character M in FIG. 1.

DETAILED DESCRIPTION OF PREFERRED EMBODIMENT

Figure 1:
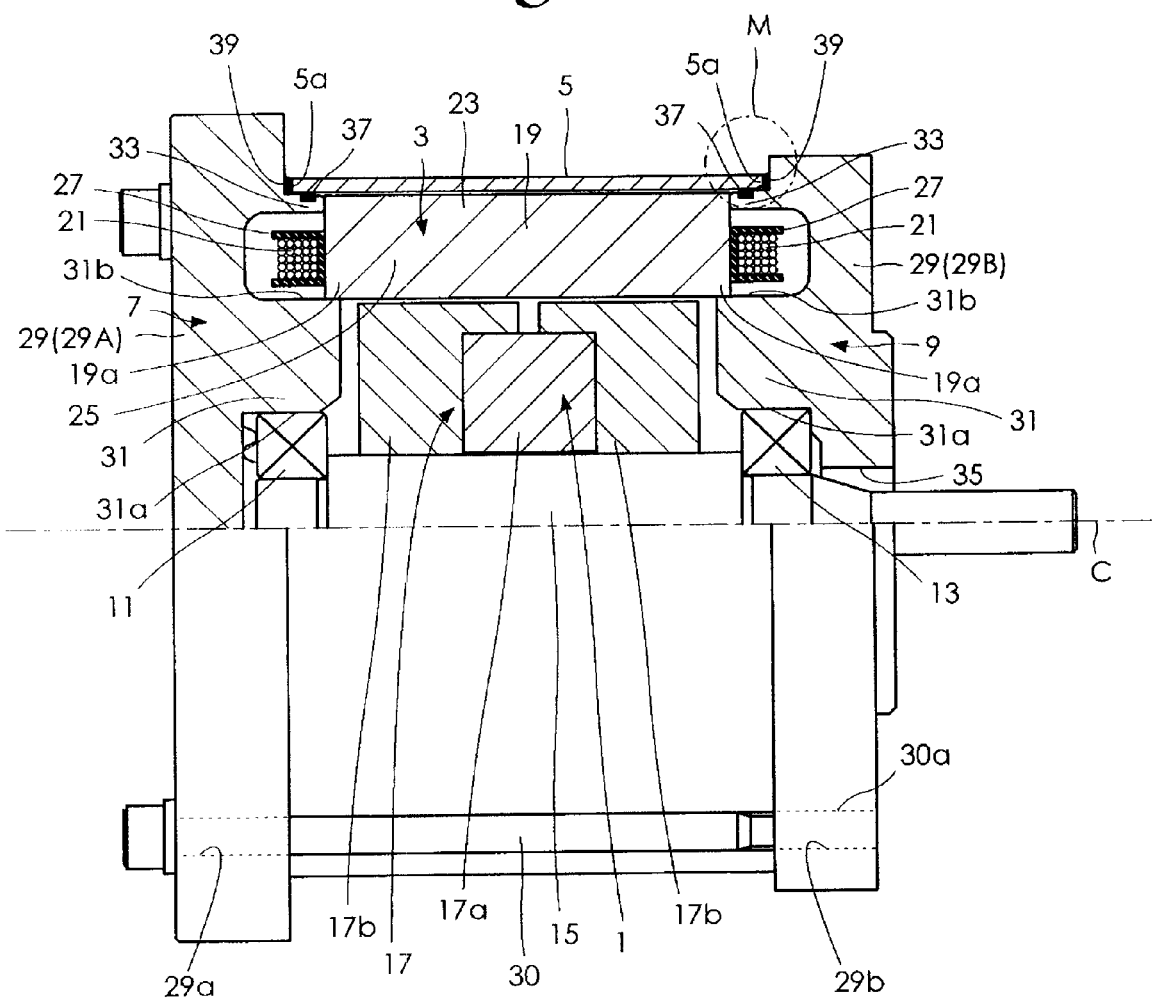
FIG. 1 a cutaway view showing a half portion of an airtight-type electric motor in an embodiment of the present invention, used in a freezer.

An embodiment of the present invention will be described below in detail with reference to drawings. FIG. 1 is a cutaway view showing a half portion of an airtight-type electric motor used in a freezer in this embodiment. FIG. 2 is a magnified view of a portion indicated by reference character M in FIG. 1. As shown in FIG. 1, the airtight-type electric motor in this embodiment includes a rotor 1, a stator 3, a housing 5, a pair of end brackets 7 and 9, and a pair of ball bearings 11 and 13. The rotor 1 includes a shaft 15 and a rotor member 17 fixed to an outer circumference of the shaft 15. The rotor member 17 includes a base portion 17a that is formed by laminating magnetic steel plates and is fitted into the shaft 15 and a plurality of permanent magnets 17b that are fitted into the shaft 15 and the base portion 17a.

The stator 3 is formed by laminating magnetic steel plates and includes a stator core 19 and a plurality of winding portions 21. The stator core 19 is arranged radially outside of the shaft 15. The stator core 19 includes a cylindrical yoke 23 and a plurality of magnetic poles 25 that project toward the shaft 15 from the yoke 23 and face the rotor member 17. The winding portions 21 are mounted on the stator core 19, being respectively wound around the magnetic poles 25 through insulators 27.

The housing 5 is made of steel and of a cylindrical shape. The housing 5 is arranged radially outside of the stator 3 and surrounds the stator 3. The housing 5 is connected to the pair of end brackets 7 and 9, as will be described later. The housing 5 serves to ensure pressure resistance and airtightness as the airtight-type electric motor for the freezer.

Each of the pair of the end brackets 7 and 9 includes a bracket body 29 that extends in a radial direction of the shaft 15, an annular inside rib 31 that is integrally formed with the bracket body 29 and projects from the bracket body 29 in an axial direction of the shaft 15, and an annular outside rib 33 that is integrally formed with the bracket body 29 and is located radially outside of the inside rib 31. The bracket body 29 has a shape of a rectangular flange. In four corners of the bracket body 29 (29A) of the end bracket 7, which is one of the pair of the end brackets 7 and 9, assembling through-holes 29a are respectively formed. In four corners of the bracket body 29 (29B) of the end bracket 9, which is the other of the pair of the end brackets 7 and 9, screw holes 29b are formed. Fastening screw members 30 are inserted into the assembling through-holes 29a, and threaded portions 30a formed at tip portions of the fastening screw members 30 are screwed into the screw holes 29b. In a central portion of the bracket body 29 (29B) of the end bracket 9, a hole 35 through which the shaft 15 passes is formed. The pair of the end brackets 7 and 9 are arranged so that the inside ribs 31 of the end brackets 7 and 9 project in a direction where the inside ribs are mutually facing and the outside ribs 33 of the end brackets 7 and 9 project in a direction where the outside ribs are mutually facing.

A pair of ball bearings 11 and 13 are fitted into inner circumferential surfaces 31a of the inside ribs 31 of the pair of the end brackets 7 and 9. The shaft 15 is rotatably supported by the pair of the end brackets 7 and 9 through the pair of ball bearings 11 and 13. Each inside rib 31 is inserted into inside the stator core 19. Outer circumferential surfaces 31b of the inside ribs 31 are fitted into both ends 19a for the magnetic poles 25 in the axial direction (core end portions 19a on both sides in the axial direction of the stator core 19). In other words, the pair of the end brackets 7 and 9 are fixed to the core end portions 19$a$ on both sides in the axial direction of the stator core 19 through fitting structures.

In each of the pair of the end brackets 7 and 9, the projection (height) of the outside rib 33 is smaller than the projection (height) of the inside rib 31. As shown in FIG. 2, the outside rib 33 includes a large diameter portion 33$a$ located on a side of the bracket body 29 and a small diameter portion 33$b$ that is continuous with the large diameter portion 33$a$. The outside ribs 33 are inserted into inside housing end portions 5$a$ on both sides in the axial direction of the housing 5. FIG. 2 is a magnified view of junctions between the bracket body 29 (29B) of the end bracket 9 and the housing 5 and a junction between the bracket body 29 (29B) and the stator core 19. Junctions between the bracket body 29 (29A) of the end bracket 7 and the housing 5 are also structured in the same manner as the junctions between the bracket body 29 (29B) and the housing 5. Then, a junction between the bracket body 29 (29A) and the stator core 19 is also structured in the same manner as the junction between the bracket body 29 (29B) and the stator core 19. An outer circumferential surface 33$e$ of the large diameter portion 33$a$ is located radially outside of an outer circumferential surface 33$f$ of the small diameter portion 33$b$. End surfaces 33$c$ of the small diameter portions 33$b$ are in contact against both end surfaces of the yoke 23 of the stator core 19 in the axial direction (end surfaces of the core end portions 19$a$ of the stator core 19). With this arrangement, the winding portions 21 are arranged within a gap surrounded by the bracket bodies 29, inside ribs 31, and outside ribs 33. In a part of the small diameter portion 33$b$ adjacent to the large diameter portion 33$a$, an annular groove 33$d$ that opens radially outward is formed. A first O-ring 37 is fitted into the groove 33$d$. This first O-ring 37 is arranged between the outside rib 33 and an inner circumferential surface of the housing end portion 5$a$. Further, between an end surface 5$b$ of the housing end portion 5$a$ and the bracket body 29, a second O-ring 39 is arranged. Then, between an inner surface of the bracket body 29 of each of the pair of the end brackets 7 and 9 and an outer circumferential surface of the outside rib 33, an annular O-ring positioning corner portion 9$a$ where the second O-ring 39 is arranged is formed. In this embodiment, the first O-ring 37 and the second O-ring 39 constitute an air-tight coupling structure, and a pair of the airtight coupling structures airtightly couple the end brackets 7 and 9 to the housing end portions 5$a$. For this reason, the outside ribs 33 are airtightly coupled to the housing end portions 5$a$ through the airtight coupling structures (37, 39). In this embodiment, the outer circumferential surface 19$a$ of the stator core 19 is flush with the outer circumferential surface 33$f$ of the small diameter portion 33$b$. For this reason, an outer circumferential surface 37$a$ of the first O-ring 37 and the outer circumferential surface 33$e$ of the large diameter portion 33$a$ are positioned radially outside of the outer circumferential surface 19$a$ of the stator core 19. For this reason, a gap G is formed between the housing 5 and the stator core 13, which means that the housing 5 is not coupled to the stator core 19.

The airtight-type electric motor in this embodiment was manufactured in the following manner. First, the insulators with electric wires wound therearound were respectively attached to the magnetic poles 25 of the stator core 19, thereby forming the winding portions 21 and then forming the stator 3. Incidentally, after the insulator 27 has been fitted with the stator core 19, the electric wires may be wound around the magnetic poles 25 of the stator core 19 through the insulator 27, thereby forming the winding portions 21. Next, connection of the electric wires that form the winding portions 21 was performed by machine automation. Then, the shaft 15 of the rotor 1 was supported by the pair of ball bearings 11 and 13 for the pair of the end brackets 7 and 9, the stator 3 and the housing 5 were arranged between the pair of the end brackets 7 and 9, and the pair of the airtight coupling structures (37, 39) were arranged between the end brackets 7 and 9 and the housing end portion 5$a$. In this situation, four fastening screw members 30 were inserted into four assembling throughholes 29$a$ formed in the bracket body 29A of the end bracket 7. Then, the threaded portions 30$a$ of the four fastening screw portions 30 were screwed into four screw holes 29$b$ formed in the bracket body 29B of the end bracket 9. With this arrangement, the outside ribs 33 of the pair of the end brackets 7 and 9 were pressed against end surfaces of the stator core 19, and the pair of the end brackets 7 and 9 were pressed against the housing 5 through the second O-rings 39, thereby completing the airtight-type electric motor.

In the airtight-type electric motor in this embodiment, the pair of the end brackets 7 and 9 were fixed to the core end portions 19$a$ on both sides in the axial direction of the stator core 19 through the fitting structures. Thus, the pair of the end brackets 7 and 9 may be firmly fixed to the stator core. The housing 5 and the stator core 19 may be thereby arranged without being coupled. For this reason, concentricity among the center of the stator core 19 and centers C of the pair of the end brackets 7 and 9 may be enhanced, without the stator core 10 being affected by the housing 5. As a result, concentricity between the rotor 1 and the stator 3 may be enhanced. Vibration of the motor may be thereby reduced. When the airtight-type electric motor is manufactured, the winding portions 21 are formed on the stator core 19 that is not coupled to the housing 5. Thus, connection of the electric wire end portions that form the winding portions 21 may be performed, without being disturbed by presence of the housing 5. For this reason, the connection may be performed by machine automation. Mass production of the airtight-type electric motor may be thereby promoted.

While the preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An airtight-type electric motor comprising:
a rotor including a rotor member and a shaft with the rotor member fixed thereto;
a stator including a stator core located radially outside of the shaft and a plurality of winding portions mounted on the stator core, the stator core including core end portions which oppose to each other in an axial direction of the shaft;
a cylindrical housing that is located radially outside of the stator and surrounds the stator, the housing including housing end portions which oppose to each other in the axial direction, wherein the housing is not in direct contact with the stator core;
a pair of bearings that rotatably support the shaft;
a pair of end brackets with the pair of bearings respectively fixed thereto, the pair of end brackets being fixed to the core end portions of the stator core through fitting structures,
each of the end brackets comprising:
a bracket body;
an inside rib integrally formed with the bracket body and inserted into inside the stator core to be fitted into the core end portion of the stator core, wherein the bearing is fitted into inside of the inside rib; and
an annular outside rib integrally formed with the bracket body and located radially outside of the inside rib to be inserted into inside the housing end portion, and
a pair of airtight coupling structures which airtightly couple the end brackets to the housing end portions,
each of the airtight coupling structures comprising:
a first O-ring arranged between the outside rib and an inner circumferential surface of the housing end portion; and
a second O-ring arranged between an end surface of the housing end portion and the bracket body of the end bracket,
wherein the outside rib is in contact against an end surface of the core end portion of the stator core and is airtightly coupled to the housing end portion of the housing through the airtight coupling structure.

2. The airtight-type electric motor according to claim 1, wherein
an annular groove that opens radially toward an outside of the outside rib is formed in the outside rib, and the first O-ring is fitted into the annular groove.

3. The airtight-type electric motor according to claim 2, wherein
an annular O-ring positioning corner portion is formed between an inner surface of the bracket body of the end bracket and an outer circumferential surface of the outside rib, the second O-ring being arranged thereon.

4. The airtight-type electric motor according to claim 1, wherein
a plurality of assembling through-holes are formed in the bracket body of one of the pair of end brackets to insert a plurality of fastening screw members therein;
a plurality of screw holes are formed in the bracket body of the other of the pair of end brackets to screw threaded portions formed at tip portions of the fastening screw members therein; and
with the shaft of the rotor being supported by the pair of bearings fixed to the pair of end brackets; the stator and the housing being arranged between the pair of end brackets; and the pair of airtight coupling structures being arranged between the end brackets and the housing end portions, the fastening screw members are inserted into the assembling through-holes formed in the bracket body of the one of the pair of end brackets and the threaded portions of the fastening screw members are screwed into the screw holes formed in the bracket body of the other of the pair of end brackets, thereby pressing the outside ribs of the end brackets against the end surfaces of the core end portions of the stator core and pressing the end brackets against the housing through the second O-rings.

5. The airtight-type electric motor according to claim 2, wherein
a plurality of assembling through-holes are formed in the bracket body of one of the pair of end brackets to insert a plurality of fastening screw members therein;
a plurality of screw holes are formed in the bracket body of the other of the pair of end brackets to screw threaded portions formed at tip portions of the fastening screw members therein; and
with the shaft of the rotor being supported by the pair of bearings fixed to the pair of end brackets; the stator and the housing being arranged between the pair of end brackets; and the pair of airtight coupling structures being arranged between the end brackets and the housing end portions, the fastening screw members are inserted into the assembling through-holes formed in the bracket body of the one of the pair of end brackets and the threaded portions of the fastening screw members are screwed into the screw holes formed in the bracket body of the other of the pair of end brackets, thereby pressing the outside ribs of the end brackets against the end surfaces of the core end portions of the stator core and pressing the end brackets against the housing through the second O-rings.

6. The airtight-type electric motor according to claim 3, wherein
a plurality of assembling through-holes are formed in the bracket body of one of the pair of end brackets to insert a plurality of fastening screw members therein;
a plurality of screw holes are formed in the bracket body of the other of the pair of end brackets to screw threaded portions formed at tip portions of the fastening screw members therein; and
with the shaft of the rotor being supported by the pair of bearings fixed to the pair of end brackets; the stator and the housing being arranged between the pair of end brackets; and the pair of airtight coupling structures being arranged between the end brackets and the housing end portions, the fastening screw members are inserted into the assembling through-holes formed in the bracket body of the one of the pair of end brackets and the threaded portions of the fastening screw members are screwed into the screw holes formed in the bracket body of the other of the pair of end brackets, thereby pressing the outside ribs of the end brackets against the end surfaces of the core end portions of the stator core and pressing the end brackets against the housing through the second O-rings.

* * * * *